(12) United States Patent
Lee

(10) Patent No.: US 11,645,945 B2
(45) Date of Patent: May 9, 2023

(54) EDUCATION DEVICE TEACHING HOW TO BRUSH TEETH AND CLEAN HANDS

(71) Applicant: Sangjea Lee, Busan (KR)

(72) Inventor: Sangjea Lee, Busan (KR)

( * ) Notice: Subject to any disclaimer, the term of this patent is extended or adjusted under 35 U.S.C. 154(b) by 0 days.

(21) Appl. No.: 17/963,193

(22) Filed: Oct. 11, 2022

(65) Prior Publication Data

US 2023/0073496 A1 Mar. 9, 2023

Related U.S. Application Data

(63) Continuation of application No. PCT/KR2022/010366, filed on Jul. 15, 2022.

(30) Foreign Application Priority Data

Sep. 8, 2021 (KR) .......................... 10-2021-0119448

(51) Int. Cl.
*G09B 19/00* (2006.01)
*G09B 5/06* (2006.01)

(52) U.S. Cl.
CPC .......... *G09B 19/0084* (2013.01); *G09B 5/06* (2013.01)

(58) Field of Classification Search
CPC .............................. G09B 19/0084; G09B 5/06
USPC ......................................................... 434/263
See application file for complete search history.

(56) References Cited

U.S. PATENT DOCUMENTS

| | | | |
|---|---|---|---|
| 2002/0058239 A1 | 5/2002 | Wang | |
| 2006/0240397 A1* | 10/2006 | Lynn | G09B 19/0084 |
| | | | 434/365 |
| 2018/0308388 A1* | 10/2018 | Kay | G08B 21/245 |

FOREIGN PATENT DOCUMENTS

| | | |
|---|---|---|
| KR | 1020100052084 A | 5/2010 |
| KR | 1020120070756 A | 1/2013 |
| KR | 2020160000263 U | 1/2017 |
| KR | 1020190081877 A | 11/2019 |
| KR | 1020210038057 A | 3/2022 |

* cited by examiner

*Primary Examiner* — Robert P Bullington, Esq.
*Assistant Examiner* — Stephen Alvesteffer
(74) *Attorney, Agent, or Firm* — Nicholas Park

(57) ABSTRACT

An education device for guiding brushing teeth and a hand washing method according to the present disclosure comprises: a memory for storing the brushing teeth and hand washing method data; a processor for retrieving the data from the memory and controlling the brushing teeth and hand washing method to be guided to an output device; a brushing teeth input device for inputting a command to guide the brushing teeth method; a hand washing input device for inputting a command to guide the hand washing method; a voice output device for guiding the brushing teeth or hand washing method by voice according to a control of the processor; a brushing teeth output device for visually outputting the brushing teeth method; and a hand washing output device for visually outputting the hand washing method.

10 Claims, 7 Drawing Sheets

EDUCATION DEVICE TEACHING HOW TO BRUSH TEETH AND CLEAN HANDS

CROSS-REFERENCE TO RELATED APPLICATION

This application is a US Bypass Continuation application of International Application No. PCT/KR2022/010366, filed on Jul. 15, 2022, and designating the United States, the International Application claiming a priority date of Sep. 8, 2021, based on prior Korean Patent Application No. 10-2021-0119448, filed on Sep. 8, 2021, the disclosure of which is incorporated herein by reference in its entirety.

BACKGROUND

Technical Field

The present disclosure relates to an education device for teaching brushing teeth and hand washing

Related Art

In general, proper management of oral hygiene is essential to maintain an appropriate general state of health beyond the prevention of dental caries and periodontal diseases (three major chronic diseases). In order to manage teeth well, it is important to brush all surfaces of the teeth in an appropriate way and remove dental plaque well so that the dental plaque is not deposited.

A common method of oral hygiene is brushing teeth. However, most people do not often brush their teeth for a sufficient amount of time (at least two minutes) in a proper manner. In addition, even if brushing is well performed, it is still very difficult for the public to clean between teeth (interdental region). The cleaning tools for this region are interdental cleaning tools such as dental floss, interdental toothbrush, and hydraulic mouthwash. However, according to a recent survey, 70% of public have never used the interdental cleaning tools in their lives.

Looking at the cause, there can be two causes. The first is a case where a proper method of using an interdental cleaning tool is not known. To solve this problem, health institutions and educational institutions should provide appropriate dental floss use education. Secondly, even if the method of using the interdental cleaning tool is known, it is not possible to actually implement the method due to lack of motivation. The present disclosure is invented to solve these two problems.

Korean Patent Laid-Open Publication No. 10-2012-0070756, which is an example of the conventional patent technology, does not implement a method for brushing teeth and hand washing, which are related to each other, in a single device, and thus there is inconvenience that users, such as children, have to learn or educate separately, and also there is an inefficient disadvantage in that the method of use or education is complicated.

SUMMARY

Technical Subject

The present disclosure is intended to provide an education device for teaching brushing teeth and hand washing

Solution

An education device for guiding a brushing teeth and hand washing method according to the present disclosure comprises: a memory for storing the brushing teeth and hand washing method data; a processor for retrieving the data from the memory and controlling the brushing teeth and hand washing method to be guided to an output device; a brushing teeth input device for inputting a command to guide the brushing teeth method; a hand washing input device for inputting a command to guide the hand washing method; a voice output device for guiding the brushing teeth or hand washing method by voice according to a control of the processor; a brushing teeth output device for visually outputting the brushing teeth method; and a hand washing output device for visually outputting the hand washing method.

The education device may be formed in a whale shape.

The brushing teeth input device may correspond to a fin at one end of a whale-shaped configuration, the hand washing input device may correspond to a fin at the other end of the whale-shaped configuration, the brushing teeth output device may correspond to a belly portion of the whale-shaped configuration, and the hand washing output device may correspond to a water spraying portion of the whale-shape configuration.

The brushing teeth output device may be divided into an upper end and a lower end based on a vertical direction, and the upper end and the lower end may be divided into a plurality of basic areas based on a horizontal direction.

The basic area may include a plurality of pixels capable of outputting a visual image.

The basic area may be configured with first, second, third, fourth, fifth, and sixth upper end basic areas based on an upper end thereof, and may be configured with first, second, third, fourth, fifth, and sixth lower end basic areas based on a lower end thereof.

The processor may control timer displaying to be output to an adjacent area when dynamic displaying is controlled to guide the brushing teeth method to one of the basic areas.

The first, second, fifth, and sixth upper end basic areas and the first, second, fifth, and sixth lower end basic areas may correspond to a molar, and the processor may output molar brushing guide displaying for the basic area corresponding to the molar.

The third, and fourth upper end basic areas, and third and fourth lower end basic areas correspond to front teeth, and the processor may output the front teeth brushing guide displaying for the basic area corresponding to the front teeth.

The processor divides the basic area in the vertical direction to individually output brushing teeth guide displaying on an inner surface, a chewing surface, and an outer surface of teeth.

The first, second, third, fourth, fifth, and sixth upper end basic areas and the first, second, third, fourth, fifth, and sixth lower end basic areas may be divided into six areas to output the hand washing auxiliary guide displaying.

An education device according to the present disclosure may provide the education device which informs the time and method such as brushing teeth and hand washing, and informs the user of brushing teeth and hand washing regularly to protect health by arousing interest.

DETAILED DESCRIPTION

Figure 1:
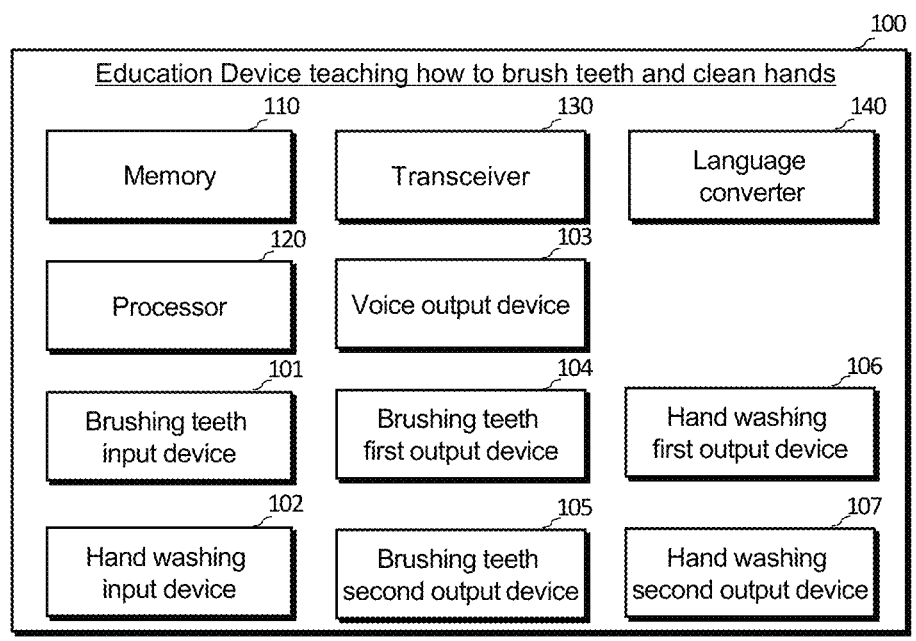
FIG. 1 is a block diagram illustrating a configuration of an education device according to the present disclosure.

Hereinafter, preferred embodiments of the present disclosure will be described in detail with reference to the accompanying drawings. Advantages and features of the present disclosure, and methods of achieving them, will become apparent with reference to the embodiments described in detail below together with the accompanying drawings. However, the technical spirit of the present disclosure is not limited to the following embodiments, but may be implemented in various forms different from each other, and the following embodiments are provided to completely implement the technical spirit of the present disclosure and to fully inform the scope of the present disclosure to those skilled in the art to which the present disclosure pertains, and the technical spirit of the present disclosure is only defined by the scope of the claims.

It should be noted that in adding reference numerals to the elements of each drawing, the same elements will be designated by the same reference numerals as possible even though they are shown in different drawings. In addition, in describing the present disclosure, when it is determined that a detailed description of related known configurations or functions may obscure the subject matter of the present disclosure, the detailed description thereof will be omitted.

Unless otherwise defined, all terms (including technical and scientific terms) used herein have the same meaning as commonly understood by one of ordinary skill in the art to which this disclosure belongs. Also, terms defined in commonly used dictionaries are not ideally or excessively interpreted unless they are clearly defined. The terms used herein are intended to describe embodiments and are not intended to limit the present disclosure. In the present specification, the singular form includes the plural form unless specifically mentioned in the phrase.

In addition, in describing the components of the present disclosure, terms such as first, second, A, B, (a), (b), and the like may be used. This term is only for distinguishing the component from other components, and the substance, sequence, or order of the corresponding component is not limited by the term. When it is described that a component is "connected", "combined", or "connected" to another component, the component may be directly connected or connected to the other component, but it will be understood that another component may be "connected", "combined", or "connected" between the components.

The terms "comprises" and/or "comprising" used in the present disclosure do not exclude the presence or addition of one or more other components, steps, operations and/or elements in the stated components, steps, operations and/or elements.

Components included in any one embodiment and components including common functions may be described using the same names in other embodiments. Unless there is an opposite description, the description described in any one embodiment may be applied to other embodiments, and the detailed description may be omitted within the overlapping range or within the range that would be obvious to a person skilled in the art.

Hereinafter, some embodiments of the present disclosure will be described in detail according to the accompanying drawings.

Hereinafter, the present disclosure will be described in detail with reference to preferred embodiments of the present disclosure and the accompanying drawings.

FIG. 1 is a block diagram illustrating a configuration of an education device 100 according to the present disclosure. Referring to FIG. 1, the education device 100 may include a memory 110, a processor 120, a transceiver 130, a language converter 140, a brushing teeth input device 101, a hand washing input device 102, a voice output device 103, a brushing teeth first output device 104, a brushing teeth second output device 105, a hand washing first output device 106, a hand washing second output device 107, and the like.

The memory 110 may store brushing teeth and hand washing method data. For example, the memory 110 may include at least one of a non-volatile memory, a volatile memory, a flash memory, a hard disk drive (HDD), and a solid state drive (SSD).

The processor 120 may control the output devices 103, 104, 105, 106, and 107 to guide the brushing teeth method and the hand washing method by retrieving data from the memory 110. The processor 120 executes an overall control function of the terminal using the program and data stored in the memory 110. The memory 110 may include various types of memories such as a random access memory (RAM), a read only memory (ROM), and the like, the processor 120 may include a microprocessor, a central processing device (CPU), a graphic processing device (GPU), and a bus, and the RAM, the ROM, the CPU, the GPU, and the like may be connected to each other through the bus.

The processor 120 may perform booting using an operating system (O/S) stored in the memory 110, and may be configured to perform various operations described in the present disclosure while operating as an application device using an application stored in the memory 110. Also, the processor 120 may include a computing device such as a workstation computer, a desktop computer, a laptop computer, a tablet computer, and the like.

The transceiver 130 is a component for the education device 100 to transmit and receive data to and from an external electronic device. For example, the transceiver 130 may include input devices such as a mouse, a keyboard, and a digital pad configured to communicate user input to the processor 120, and may include a display or the like that displays instructions of the processor 120.

The language converter 140 is a configuration for converting a language, which the education device 100 outputs a guide for brushing teeth and hand washing through the voice output device 103, into another language. In an exemplary embodiment, the voice output device 103 may output the guide of brushing teeth and hands washing through a voice output device such as a speaker.

The language converter 140 may be configured to convert a first language provided by the voice output device 103 into a second language which is different from the first language. For example, the language converter 140 may include a microprocessor, a CPU, a GPU, and the like, which convert a language provided from the voice output device 103.

In an embodiment, the language converter 140 may be a part of the processor 120 configured to convert a first language provided by the voice output device 103 of the processor 120 into a second language different from the first language.

The brushing teeth input device 101 may include a first sensor that detects a user's movement. In other words, the first sensor may be a sensor for detecting a user's movement for a guide of brushing teeth. Specifically, the first sensor may comprise a sensor such as a touch sensor and a motion sensor for a user to receive a guide for brushing teeth through the education device 100. For example, a touch sensor may include a capacitive touch sensor, a resistive touch sensor, an infrared touch sensor, or the like configured to sense a user's touch, movement, or the like. The brushing teeth input 101 may be configured to recognize a physical contact or movement of the user and transmit corresponding information to the processor 120 to control the brushing teeth guide.

The hand washing input device 102 may include a second sensor that detects a user's movement. In other words, the second sensor may be a sensor for detecting a user's movement for a guide of hand washing. Specifically, the second sensor may comprise a sensor such as a touch sensor, a motion sensor, or the like, for a user to receive a hand washing guide through the education device 100. For example, the touch sensor may include a capacitive touch sensor, a resistive touch sensor, an infrared touch sensor, or the like configured to sense a user's touch and movement. The hand washing input device 102 may be configured to control the hand washing guide by recognizing a physical contact or movement of the user and transmitting corresponding information to the processor 120.

The output devices 103, 104, 105, 106, and 107 visually and auditorily output the brushing teeth method according to the brushing teeth method data and the hand washing method data and visually and auditorily output the hand washing method under the control of the processor 120. For example, the output devices 103, 104, 105, 106, and 107 may include a display that visually outputs a control command of the processor 120, and may include a speaker that audibly outputs a control command of the processor 120.

The voice output device 103 audibly outputs the brushing teeth method according to the brushing teeth method data and the hand washing method data under the control of the processor 120. For example, the voice output device 103 may include a speaker.

The brushing teeth first output device 104 and the brushing teeth second output device 105 may be controlled by the processor 120 to output brushing teeth guide displaying according to the brushing teeth method data. For example, the brushing teeth first output 104 and the brushing teeth second output 105 may include a display configured to express an image signal transmitted from the processor 120 in a user-recognizable visual content.

Based on the human oral cavity structure, the brushing teeth first output device 104 may correspond to the lower jaw portion, and the brushing teeth second output device 105 may correspond to the upper jaw portion.

The brushing teeth first output device 104 may be divided into a plurality of basic areas based on left and right, and the brushing teeth second output device 105 may be divided into a plurality of basic areas based on left and right. Details thereof will be described later with reference to FIGS. 2 to 3.

The hand washing first output device 106 and the hand washing second output device 107 may be controlled to output a hand washing guide displaying through a display which is a light output. Details thereof will be described later with reference to FIGS. 2 to 3.

Figure 2:
FIG. 2 is a perspective view illustrating a configuration of an education device in the present disclosure.
Figure 3:
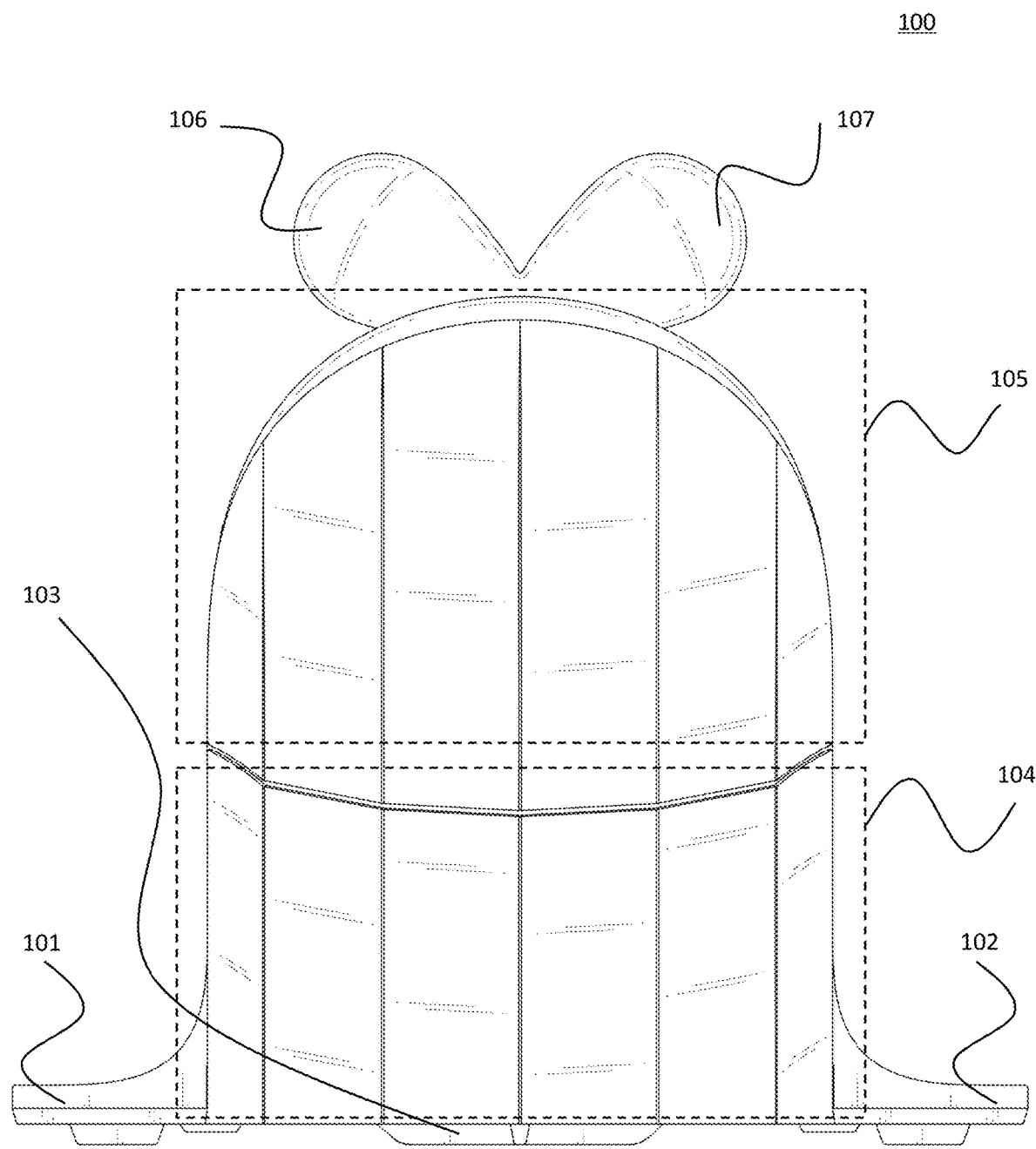
FIG. 3 is a front view illustrating a configuration of an education device according to the present disclosure.

FIG. 2 is a perspective view illustrating a configuration of the education device 100 according to the present disclosure. FIG. 3 is a front view illustrating a configuration of an education device according to the present disclosure. Referring to FIGS. 2 and 3, the education device 100 includes a brushing teeth input device 101, a hand washing input device 102, a voice output device 103, a brushing teeth first output device 104, a brushing teeth second output device 105, a hand washing first output device 106, and a hand washing second output device 107.

The education device 100 may be formed in an animal shape for effective education of children. For example, the education device 100 may be formed in a whale shape.

Referring to FIGS. 2 and 3, the brushing teeth input device 101 may correspond to a fin at one end of a whale-shaped configuration, the hand washing input device 102 may correspond to a fin at the other end of the whale-shaped configuration, the brushing teeth output devices 104 and 105 may correspond to a belly portion of the whale-shaped configuration, and the hand washing output devices 106 and 107 may correspond to a water spraying portion of the whale-shaped configuration.

As described above, the brushing teeth output device may correspond to an oral structure of a human based on the top and bottom. Specifically, based on the human oral cavity structure, the brushing teeth first output device 104 may correspond to the lower jaw portion, and the brushing teeth second output device 105 may correspond to the upper jaw portion. In addition, the brushing teeth first output device 104 and the brushing teeth second output device 105 may be divided into a plurality of basic areas based on left and right sides.

In an exemplary embodiment, the brushing teeth first output device 104 may be divided into a first lower end basic area 104a, a second lower end basic area 104b, a third lower end basic area 104c, a fourth lower end basic area 104d, a fifth lower end basic area 104e, and a sixth lower end basic area 104f.

In an exemplary embodiment, the brushing teeth second output device 105 may be divided into a first upper end basic area 105a, a second upper end basic area 105b, a third upper end basic area 105c, a fourth upper end basic area 105d, a fifth upper end basic area 105e, and a sixth upper end basic area 105f.

Each of the plurality of basic areas may correspond to specific teeth regions. For example, in the present disclosure, the third lower end basic area 104c and the fourth lower end basic area 104d may correspond to the lower jaw front teeth, and the third upper end basic area 105c and the fourth upper end basic area 105d may correspond to the upper jaw front teeth.

In an exemplary embodiment, the second lower base area 104b and the fifth lower base area 104e may correspond to a small molar of the upper jaw, and the second upper base area 105b and the fifth upper base area 105e may correspond to a small molar of the maxilla.

In an exemplary embodiment, the first lower base area 104a and the sixth lower base area 104f may correspond to a large molar of the upper jaw, and the first upper base area 105a and the sixth upper base area 105f may correspond to a large molar of the maxilla.

The processor 120 may retrieve the brushing teeth data from the memory 110 and output information on the brushing teeth data from the brushing teeth first output device 104 and the brushing teeth second output device 105. The brushing teeth data may be data in which visual output information and audio output information on a brushing teeth method previously set in consideration of teeth states of a target user such as an adult or a child are stored.

For example, the processor 120 may guide the brushing teeth method sequentially in the first upper base area 105a to reach the sixth upper base area 105f. Thereafter, the first lower end basic area 104a may be reached by sequentially guiding the brushing teeth method again in the sixth lower end basic area 104f. In the visual display, the voice output device 103 may guide the corresponding brushing teeth method in a predetermined language in each corresponding basic area. In an exemplary embodiment, the language may be changed by the language converter 140.

For example, the processor 120 may guide the third lower end basic area 104c and the fourth lower end basic area 104d corresponding to the lower jaw front teeth, and the third upper end basic area 105c, and the fourth upper end basic area 105d corresponding to the upper jaw front teeth, to use a method of brushing teeth one by one using a toothbrush vertically, and particularly, may guide the inner surface of the lower front teeth where the dendrons are more well formed to be allocated 15% or more longer than the outer surface. Specifically, the processor may guide the outer surface of the upper front teeth to be 6 seconds, the inner surface to be 7 seconds, the outer surface of the lower front teeth to be 6 seconds, and the inner surface to be 7 seconds.

For example, the processor 120 may consider that the second lower end basic area 104b and the fifth lower end basic area 104e corresponding to a small molar of the lower jaw, and the second upper end basic area 105b and the fifth upper end basic area 105b corresponding to a small molar of the upper jaw are more prone to cavities than the front teeth. Accordingly, the processor 120 may allocate the brushing time of the molars longer than the brushing time of the front teeth by 80% or more.

And the processor 120 may allocate a brushing time longer than the side surfaces of the molar for a chewing surface by 30% to 40% compared to the side surfaces of the molar. Specifically, the output may be controlled to perform visual guide and auditory guide so as to allocate 6 seconds of the outer surface of the upper molar, 10 second of the chewing surface, 7 second of the inner surface, 7 second of the outer surface of the lower molar, 10 second of the chewing surface, and 6 second of the inner surface.

The processor 120 may guide a method of brushing the molars when the molars vibrate sideways on the inner surface and the outer surface of the molars and the outer surface of the front teeth and then vertically descend, and may guide a method of brushing the molars when the molars move back and forth on the chewing surface.

For example, the processor 120 may allocate a molar portion, in which teeth are more easily filled, to the first lower end basic area 104a, the sixth lower end basic area 104f, and the first upper end basic area 105a and the sixth upper end basic area 105f corresponding to the large molar of the upper jaw, for a time longer than the front teeth by 80% or more, and allocate a time longer than the lateral surface of the molar for a time longer than the lateral surface of the molar for a chewing surface by 30% to 40%. Specifically, the output may be controlled to perform visual guide and auditory guide so as to allocate 6 second of the outer surface of the upper molar, 10 second of the chewing surface, 7 second of the inner surface, 7 second of the outer surface of the lower molar, 10 second of the chewing surface, and 6 second of the inner surface.

The processor 120 may retrieve the hand washing data from the memory 110, perform visual guide displaying in the hand washing first output device 106 and the hand washing second output device 107, and output voice guide through the voice output device 103.

In detail, the processor 120 may divide the hand washing for 20 seconds into six areas and guide the hand washing through the hand washing first output device 106 and the hand washing second output device 107.

1. Both-hand palm: Rub palms together
2. Back of left hand: Rub back of left hand
3. Back of right hand: Rub back of right hand
4. Inter-finger: Palm to palm with interlaced fingers
5. Fingertips and fingernails: Rub finger tips and nails
6. Both thumbs: Rub both thumbs Referring to FIGS. 2 and 3, the hand washing first output device 106 may include a connection device which is divided into a fountain shape of the hand washing second output device 107 and is connected thereto, and two spherical displays. The appearance of the display may be partially modified by the user's operation, and the output area and the light quantity of the spherical display may be adjusted in real time by the user, thereby enabling an efficient display for hand washing of both hands.

For example, the hand washing first output device 106 may correspond to a left hand, and the hand washing second output device 107 may correspond to a right hand.

In the case of both-hand palm hand washing, the processor 120 may guide the hand washing operation of both-hand palms by outputting the light source to rotate in the lower areas of the spheres of the hand washing first output device 106 and the hand washing second output device 107.

In the case of the back of the left hand washing, the processor 120 may guide the back of the hand washing operation by outputting the light source to rotate in the upper area of the sphere of the first hand washing device 106.

In the case of the back of the right hand washing, the processor 120 may guide the back of the hand washing operation by outputting the light source to rotate in the upper area of the sphere of the second hand washing device 107.

In the case of the inter-finger washing, the processor 120 may guide the inter-finger washing operation by outputting the light sources to reciprocate left and right at the adjacent directional and fractional connection portions of the hand washing first output device 106 and the hand washing second output device 107.

In the case of fingertip and fingernail washing, the processor may guide the fingertip and fingernail washing operation by outputting a plurality of small light sources from the first hand washing device 106 and the second hand washing device 107 and vibrating the corresponding light sources to be adjacent to and apart from each other.

Of course, the processor 120 may also perform voice guide through the voice output device 103 to supplement the guide information of the deformalized visual output devices, the hand washing first output device 106 and the hand washing second output device 107.

Figure 4:
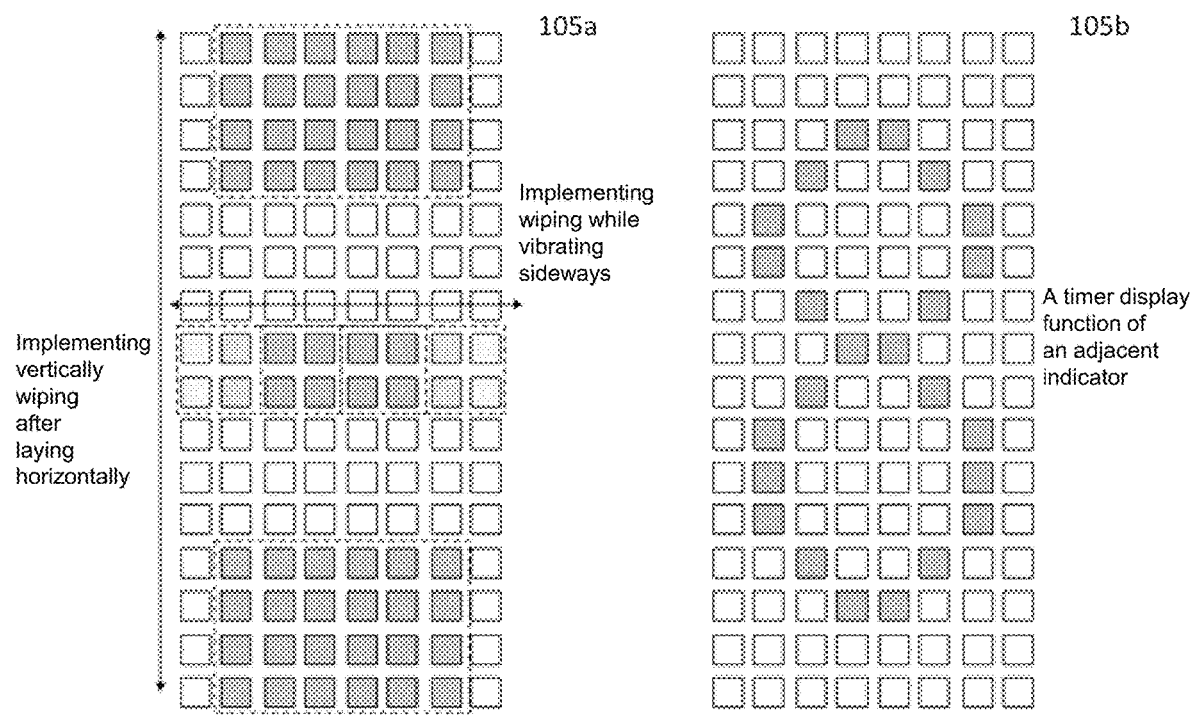
FIG. 4 is a diagram illustrating an output state of a brushing teeth output device of an education device according to the present disclosure.

FIG. 4 is a diagram illustrating an output state of a brushing teeth output device of an education device according to the present disclosure. Referring to FIGS. 1 and 4, the basic area constituting the brushing teeth output device may be composed of a plurality of pixels capable of outputting a visual sense.

Since the basic area corresponding to one tooth region is configured again with the plurality of pixels, the processor 120 may be able to perform detailed display for detailed operations such as brushing vertically, brushing horizontally, vibrating, brushing inner surface of the teeth, outer surface, and chewing surface.

The processor 120 may display additional information on an adjacent basic area, for example, the second upper end basic area 105b, which does not need to perform the guidance function, when the guidance displaying related to molar brushing is performed on one basic area of the basic areas, for example, the first upper end basic area 105a. The processor 120 may control the timer display to be output to the adjacent basic area when controlling the dynamic display to the specific basic area to guide the brushing teeth method.

For example, timing information on an operation being performed in an adjacent basic area may be provided, or brushing area information on detailed information requiring brushing in a tooth shape or teeth may be provided. The contents shown in FIG. 4 are for one embodiment and are not limited to a specific embodiment.

Figure 5:
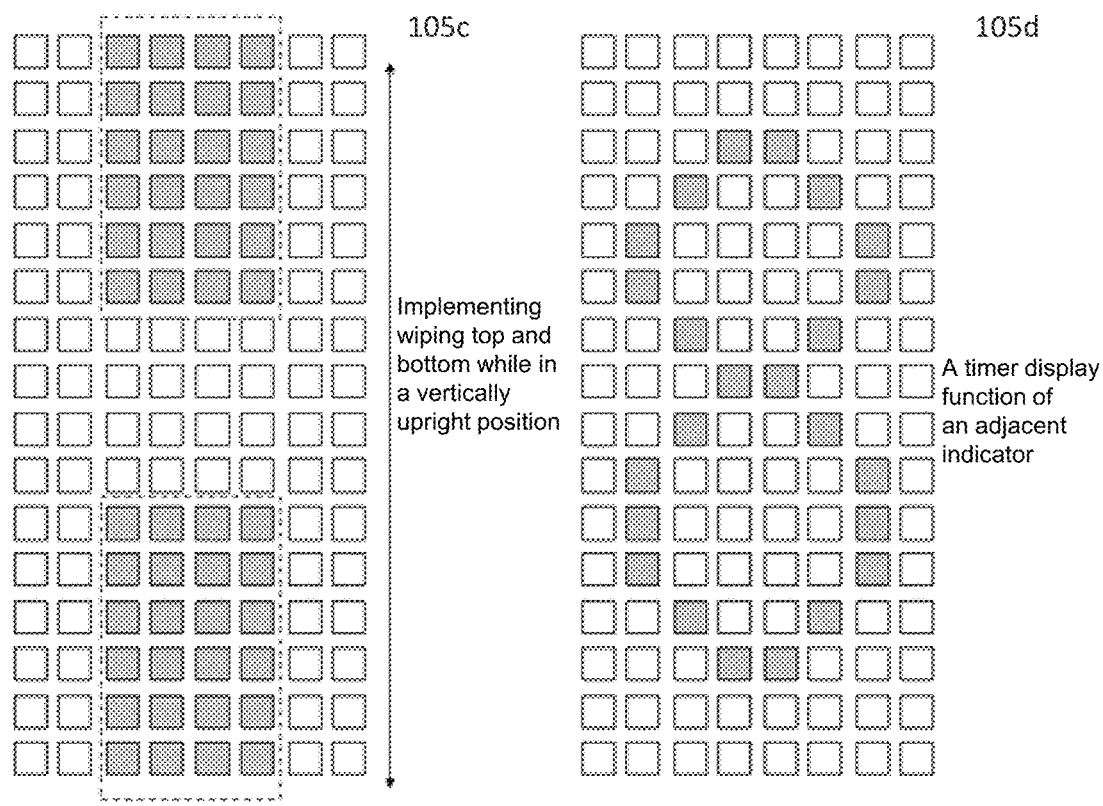
FIG. 5 is a diagram illustrating an output state of a brushing teeth output device of an education device according to the present disclosure.

Referring to FIG. 5, when guiding display related to brushing front teeth is being performed in the third upper end basic area 105c, an adjacent basic area which does not need to perform the guide function, for example, the fourth upper end basic area 105d (or the second upper end basic area 105b), may be controlled to output timer displaying or guide brushing area information.

Figure 6:
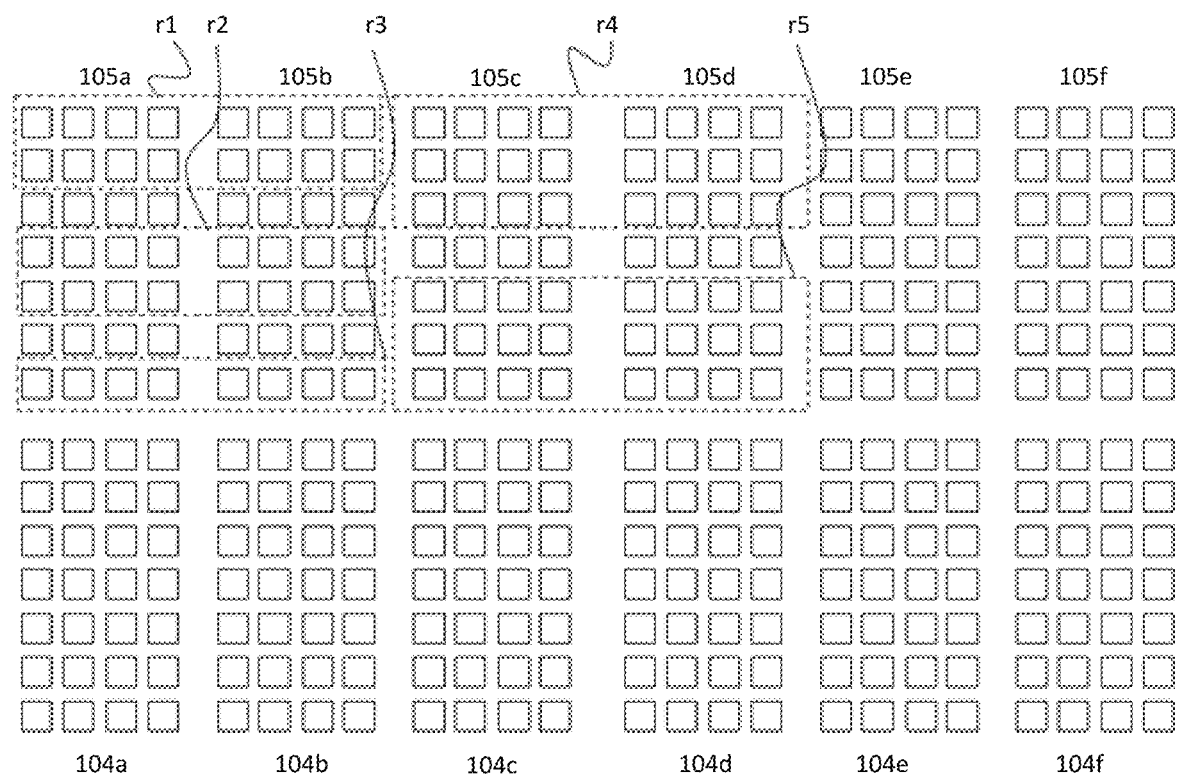
FIG. 6 is a diagram illustrating a control method for individually outputting brushing teeth guide displaying on an inner surface, a chewing surface, and an outer surface of teeth by partitioning a pixel area of a brushing teeth output device of an education device according to the present disclosure.

FIG. 6 is a diagram illustrating a control method for individually outputting brushing teeth guide displaying on an inner surface, a chewing surface, and an outer surface of teeth by partitioning a pixel area of a brushing teeth output device of an education device according to the present disclosure. Referring to FIG. 6, the basic area is repartitioned in pixel devices, which are detailed device elements, rather than the existing partitioned method, so that the processor 120 may more easily perform guide display based on brushing teeth or hand washing data.

For example, although the first upper end basic area 105a and the second upper end basic area 105b corresponding to the molar correspond to two basic areas in the left-right direction in the related art, the first upper end basic area 105a and the second upper end basic area 105b may be rearranged as a single device. In detail, instead of a partitioning method corresponding to a single basic area in a transverse direction, the first upper end basic area 105a and the second upper end basic area 105b are rearranged to an outer surface area r1, an inner surface area r2, and a chewing surface area r3, thereby efficiently guiding brushing teeth information. In the case of the third upper end basic area 105c and the fourth upper end basic area 105d corresponding to the front teeth, the third upper end basic area 105c and the fourth upper end basic area 105d corresponding to the front teeth correspond to two basic areas in the left and right directions, but may be rearranged as a single device. In detail, instead of the partitioning method corresponding to the single basic area in the transverse direction, the third upper end basic area 105c and the fourth upper end basic area 105d may be redistributed to the upper area r4 and the lower area r5, thereby efficiently displaying the front teeth brushing information.

Figure 7:
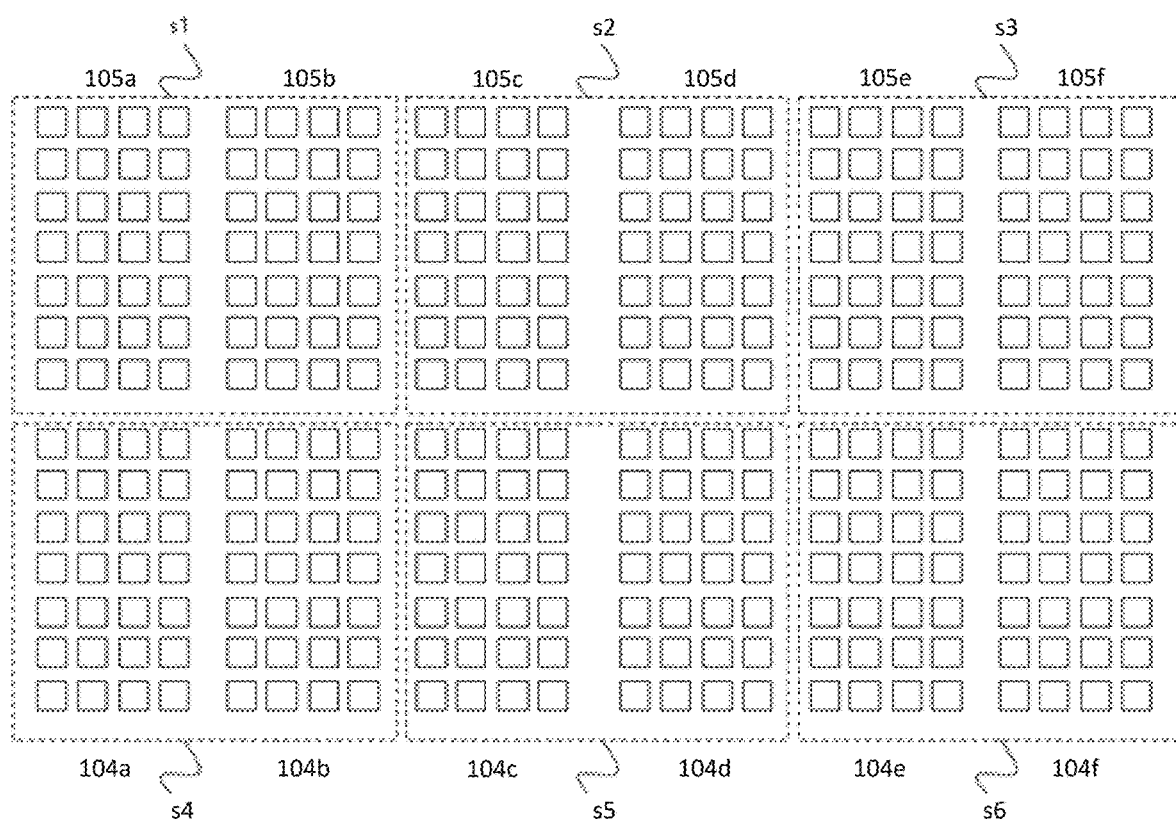
FIG. 7 is a diagram illustrating a control method for dividing a pixel area of a brushing teeth output device of an education device according to the present disclosure and driving the divided pixel area with auxiliary displaying for hand washing guide.

FIG. 7 is a diagram illustrating a control method for dividing a pixel area of a brushing teeth output device of an education device according to the present disclosure and driving the divided pixel area with auxiliary displaying for hand washing guide.

Referring to FIG. 7, an embodiment in which the brushing teeth output devices 104 and 105 are used as complementary displays in order to supplement the hand washing output devices 106 and 107 which are difficult to output relatively detailed information is illustrated.

Referring to FIG. 7, the brushing teeth output devices 104 and 105 may be divided into a palm hand washing area S1, a back of a left hand washing area S2, a back of a right hand washing area S3, a thumb hand washing area S4, a nail washing area S5, and a finger washing area S6 for hand washing displaying. And while the hand washing guide displaying is performed through the hand washing output devices 106 and 107, the brushing teeth output devices 104 and 105 may also perform the hand washing auxiliary guide displaying in the same time period.

In addition, the education device according to the present disclosure may perform individual operations according to the following modes.

In the case of brushing teeth,

A. In adult mode, a method of brushing teeth suitable for general adult teeth can be guided. Adult teeth generally have 32 teeth, including wisdom teeth. The teeth region is divided into 16 regions to provide a brushing teeth method capable of precisely managing teeth.

B. In the child mode, a method of brushing teeth suitable for the teeth of a child may be guided. Generally, children under the age of 6 have fewer than 20 teeth, and children under the age of 12 have fewer than 24 teeth. Also, in the case of children, the height of the teeth that come out of the gums is relatively lower than in adults, so the area occupied by the sides of the teeth is very narrow. Therefore, unlike adults, in the case of children, the present invention provides a easier and more efficient brushing by simply dividing the entire teeth region into six regions.

The education device of the present disclosure may guide the following modes per operation time.

A. The standard mode is a general standard brushing teeth mode, and may be performed, for example, for 2 minutes.

B. The advanced mode is a mode in which a rinsing time is increased by 20% or more than that of the general mode, thereby securing a sufficient washing time. For example, the advanced mode may be performed for 2 minutes and 30 seconds longer than the normal mode.

The education device of the present disclosure may utilize records and weights of brushing teeth function usage history.

A. The processor 120 may store the number of brushing teeth operations performed on the day in the memory 110 every day.

B. When the brushing teeth starts, the processor 120 retrieves the number of brushing performed on the previous day from the memory 110. If the number of times is less than two, the user is guided by voice, and the user is allowed to select whether to enter the above-described advanced mode. If there is no input, the robot automatically enters the above-described high mode, and this provides a function for supplementing the insufficient brushing time on the previous day. If the user selects the cancel button, the terminal enters the normal mode.

C. When the brushing teeth function is continuously operated at least twice a day for a designated period (for example, a week), a praise message is given on the last day of the designated period to assist a user to develop a brushing teeth habit.

Meanwhile, the above-described method may be written as a program executable in a computer and may be implemented in a general-purpose digital computer that operates the program using a computer-readable medium. Also, the structure of the data used in the above-described method may be recorded in a computer-readable storage medium through various means. Program storage devices that may be used to describe a storage device that includes executable computer code for performing various methods of the present disclosure should not be understood to include temporary objects such as carrier waves or signals. The computer-readable storage medium may include a storage medium such as a magnetic storage medium (e.g., a ROM, a floppy disk, a hard disk, etc.) or an optical reading medium (e.g., a CD-ROM, a DVD, etc.).

Exemplary embodiments have been disclosed in the drawings and specifications as above. Although embodiments have been described using specific terms in the present specification, the embodiments are merely used for the purpose of describing the technical idea of the present disclosure and are not used to limit the scope of the present disclosure described in the scope and spirit of the present disclosure. Therefore, those skilled in the art will understand that various modifications and other equivalent embodiments are possible therefrom. Accordingly, the true technical protection scope of the present disclosure should be determined by the technical spirit of the appended claims.

What is claimed is:

1. An education device for guiding brushing teeth and a hand washing method, comprising:
    a memory configured to store brushing teeth and hand washing method data;
    a processor configured to retrieve data from the memory and control the brushing teeth and hand washing method to be guided;
    a brushing teeth input device configured to input a command to guide the brushing teeth method and comprising a first sensor configured to sense a user's movement for a brushing teeth guide;
    a hand washing input device configured to input a command to guide the hand washing method and comprising a second sensor configured to sense a user's movement for a hand washing guide;
    a voice output device comprising a speaker configured to guide the brushing teeth or hand washing method by voice based on a control of the processor;
    a brushing teeth output device comprising a display configured to be connected to the processor and to visually output the brushing teeth method; and
    a hand washing output device comprising a display configured to be connected to the processor and to visually output the hand washing method,
    wherein the brushing teeth output device comprises a plurality of hand washing areas configured to assist in guiding the hand washing method, and the brushing teeth output device performs hand washing auxiliary guide through the plurality of hand washing areas while a hand washing guide displaying is performed through the hand washing output device.

2. The education device of claim 1, wherein the education device is formed in a whale shape.

3. The education device of claim 2, wherein the brushing teeth input device corresponds to a fin at one end of a whale-shaped configuration, the hand washing input device may correspond to a fin at the other end of the whale-shaped configuration, the brushing teeth output device may correspond to a belly portion of the whale-shaped configuration, and the hand washing output device may correspond to a water spraying portion of the whale-shape configuration.

4. The education device of claim 1, wherein the brushing teeth output device is divided into an upper end and a lower end based on a vertical direction, and the upper end and the lower end may be divided into a plurality of basic areas based on a horizontal direction.

5. The education device of claim 4, wherein the basic area comprises a plurality of pixels capable of outputting a visual image.

6. The education device of claim 5, wherein the processor controls the timer displaying to be output to an adjacent area when dynamic displaying is controlled to guide the brushing teeth method to one of the basic areas.

7. The educational device of claim 5, wherein the processor divides the basic area in the vertical direction to individually output brushing teeth guide displaying on an inner surface, a chewing surface, and an outer surface of teeth.

8. The education device of claim 4, wherein the basic area is configured with first, second, third, fourth, fifth, and sixth upper end basic areas based on an upper end thereof, and is configured with first, second, third, fourth, fifth, and sixth lower end basic areas based on a lower end thereof.

9. The education device of claim 8, wherein the first, second, fifth, and sixth upper end basic areas and the first, second, fifth, and sixth lower end basic areas correspond to a molar, and the processor outputs molar brushing guide displaying for the basic area corresponding to the molar.

10. The education device of claim 8, wherein the third and fourth upper end basic areas, and the third and fourth lower end basic areas correspond to front teeth, and the processor outputs a front teeth brushing guide displaying for the basic area corresponding to the front teeth.

* * * * *